US010104547B1

(12) United States Patent
Thanayankizil et al.

(10) Patent No.: US 10,104,547 B1
(45) Date of Patent: Oct. 16, 2018

(54) AUTOMATIC WIRELESS COMMUNICATION AUTHENTICATION

(71) Applicant: GM Global Technology Operations LLC, Detroit, MI (US)

(72) Inventors: Lakshmi V. Thanayankizil, Rochester Hills, MI (US); David P. Pop, Garden City, MI (US); Fan Bai, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/604,140

(22) Filed: May 24, 2017

(51) Int. Cl.
*H04W 12/06* (2009.01)
*H04W 12/04* (2009.01)
*H04W 76/02* (2009.01)
*H04L 29/06* (2006.01)
*H04W 76/11* (2018.01)

(52) U.S. Cl.
CPC ......... *H04W 12/06* (2013.01); *H04L 63/0428* (2013.01); *H04L 63/06* (2013.01); *H04L 63/083* (2013.01); *H04W 12/04* (2013.01); *H04W 76/021* (2013.01); *H04W 76/11* (2018.02)

(58) Field of Classification Search
CPC ......... H04W 4/046; H04W 4/06; H04W 4/12; H04W 4/17; H04W 12/04; H04W 12/06; H04W 12/08
See application file for complete search history.

(56) References Cited

U.S. PATENT DOCUMENTS

| | | | | |
|---|---|---|---|---|
| 7,548,744 | B2* | 6/2009 | Oesterling | H04L 63/08 455/410 |
| 8,996,868 | B2* | 3/2015 | Lee | H04W 12/02 713/168 |
| 9,374,355 | B2* | 6/2016 | Schwarz | H04L 63/12 |
| 2009/0328189 | A1* | 12/2009 | Budyta | H04L 9/32 726/14 |
| 2012/0311340 | A1* | 12/2012 | Naganuma | G06F 21/35 713/176 |
| 2013/0179689 | A1* | 7/2013 | Matsumoto | G06F 8/61 713/171 |

\* cited by examiner

*Primary Examiner* — Jean Gelin
(74) *Attorney, Agent, or Firm* — David Willoughby; Reising Ethington P.C.

(57) ABSTRACT

A system and method of automatically establishing a secure wireless connection, the method comprising: transmitting a wireless signal indicating availability of a secured wireless service; receiving a request from a vehicle in response to the wireless signal; in response to receiving the request, sending a message via wireless communications to the vehicle, wherein the message includes encrypted access point credentials, and wherein the encrypted access point credentials are encrypted using a key; and establishing a secure wireless connection with the vehicle based on receipt of access point credentials in one or more messages sent from the vehicle.

18 Claims, 2 Drawing Sheets

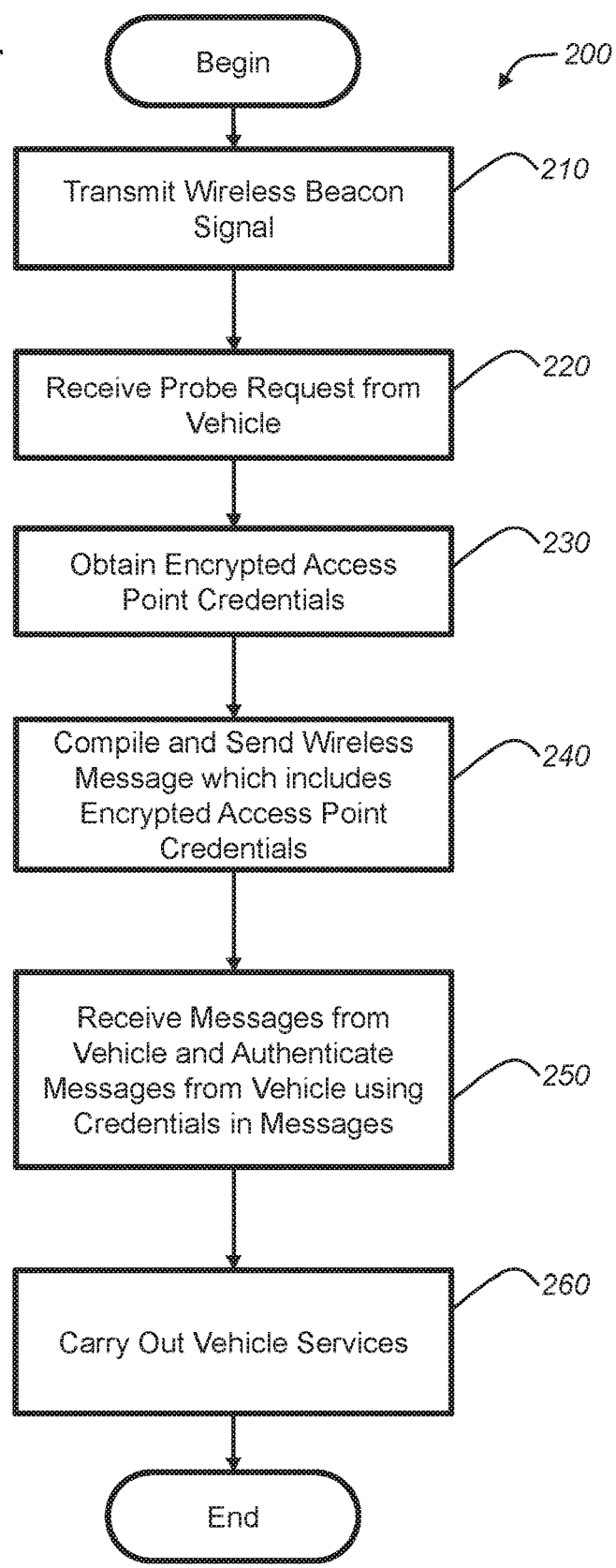

AUTOMATIC WIRELESS COMMUNICATION AUTHENTICATION

INTRODUCTION

The disclosure relates to automatically establishing a secured wireless connection including sending encrypted access point credentials to be used in establishing the secured wireless connection.

Many electronic devices now carry out network communications. For example, many vehicles can transmit voice and data communications over both a short-range wireless network, such as Wi-Fi™, and a cellular network, such as GPRS or CDMA. Now, many vehicle components, devices, and modules desire to send to or receive data from a remote server, such as a vehicle backend service facility. Vehicles may additionally include numerous wireless communication protocols and mechanisms, such as Bluetooth™, and Wi-Fi Aware™. These mechanisms can allow for secure short-range wireless communications with a non-vehicle wireless access point through use of a shared passphrase or password. However, the passphrase or password may change from time to time and, thus, there is a need to notify the vehicle of the new passphrase or password.

SUMMARY

According to an embodiment, there is provided a method of automatically establishing a secure wireless connection, the method comprising: transmitting a wireless signal indicating availability of a secured wireless service; receiving a request from a vehicle in response to the wireless signal; in response to receiving the request, sending a message via wireless communications to the vehicle, wherein the message includes encrypted access point credentials, and wherein the encrypted access point credentials are encrypted using a key; and establishing a secure wireless connection with the vehicle based on receipt of access point credentials in one or more messages sent from the vehicle.

According to another embodiment, there is provided a method of automatically establishing a secure wireless connection, wherein the method is carried out by a wireless communication device, the method comprising: receiving a wireless request from a vehicle, wherein the wireless request indicates that a vehicle desires to connect to the wireless communication device; processing the wireless request to obtain information relating to the vehicle; broadcasting a wireless message, wherein the wireless message includes encrypted access point credentials, wherein the encrypted access point credentials are access point credentials for the wireless communication device, or a component thereof, that are encrypted using a key; receiving credentials from the vehicle; authenticating the credentials received from the vehicle by comparing the credentials with the access point credentials; and establishing a wireless connection with the vehicle based on the authentication of the credentials.

According to yet another embodiment, there is provided a wireless communications system, comprising: a wireless communications device, comprising: a wireless communication chipset; a computer-readable memory; and a processor; wherein the wireless communications device is configured to: transmit a wireless signal indicating availability of a secured wireless service; receive a request from a vehicle in response to the wireless signal; in response to receiving the request, send a message via wireless communications to the vehicle, wherein the message includes encrypted access point credentials, and wherein the encrypted access point credentials are encrypted using a key; and establish a secure wireless connection with the vehicle based on receipt of access point credentials in one or more messages sent from the vehicle.

BRIEF DESCRIPTION OF THE DRAWINGS

Exemplary embodiments will hereinafter be described in conjunction with the appended drawings, wherein like designations denote like elements, and wherein:

FIG. 2 is a flowchart illustrating a method of automatically establishing a secure wireless connection.

DETAILED DESCRIPTION

Figure 1:
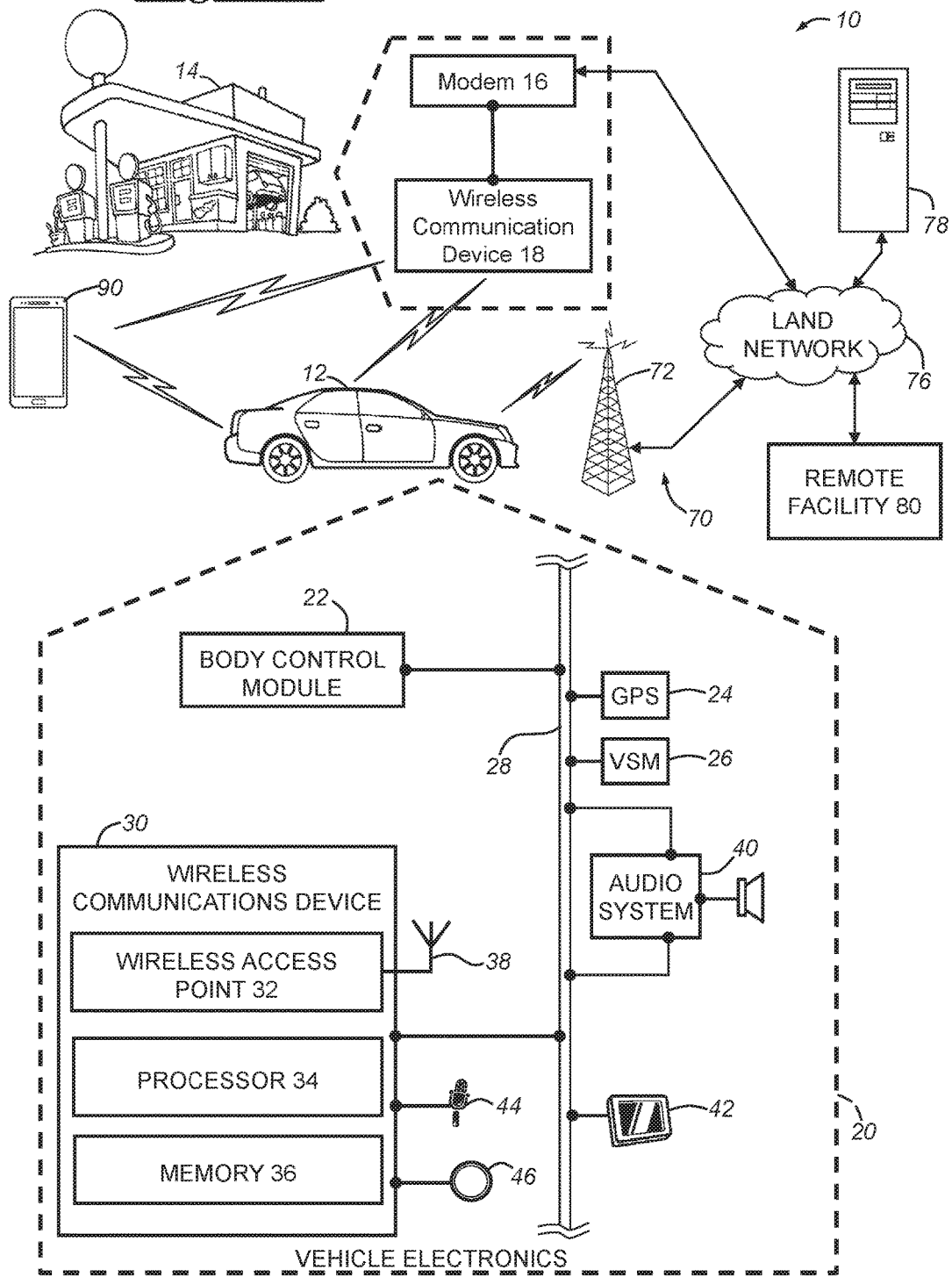
FIG. 1 is a block diagram depicting an embodiment of a communications system that is capable of utilizing the method disclosed herein.

The system and methods below enable a vehicle to automatically establish a secure wireless connection with an access point, such as a non-vehicle access point (e.g., an access point that is not part of the vehicle electronics, as discussed more below). In one scenario, it may be desirable for a vehicle to connect to a wireless access point at a service station or dealership thereby allowing certain wireless data to be transferred, such as providing software updates to the vehicle or providing vehicle diagnostic information to the service station or dealership. Additionally, it may be desirable to establish a secured connection such that sensitive information that may be contained in the wireless messages is protected. Many wireless security schemes and protocols require a pre-shared key, such as a passphrase for Wi-Fi™, which may be changed from time to time for certain reasons, such as for improved security. When the pre-shared key or passphrase changes, the vehicle needs to be updated with the new pre-shared key or passphrase, which generally requires a user to manually input the new key or passphrase. Additionally, different wireless communication devices or wireless access points (WAPs) may use different passphrases and, thus, the vehicle (or other client device) may need to know (e.g., have saved in memory) such passphrases for each wireless communication device or WAP that it desires to connect to. The method below, at least in some embodiments, provides a scheme of automatically establishing a secure wireless connection through providing a vehicle with encrypted access point credentials that are encrypted using a key known to the vehicle.

In one embodiment, there is provided a method of automatically establishing a secure connection between a vehicle and a non-vehicle wireless communication device (e.g., a device that includes a non-vehicle wireless access point, as discussed more below) when the passphrase for the non-vehicle WAP is not known to the vehicle. In some embodiments, the method comprises the steps of transmitting a wireless signal indicating availability of a secured wireless service; receiving a request from a vehicle in response to the wireless signal; sending a message via wireless communications to the vehicle; and establishing a secure connection with the vehicle based on receipt of the access point credentials in one or more messages sent from the vehicle. Thus, at least in one embodiment, the vehicle and the non-vehicle WAP each have stored thereon, or at least access to, a key that the non-vehicle WAP uses to encrypt the new access point credentials (e.g., a passphrase in the case of Wi-Fi™, as will be discussed more below). The encrypted access point credentials are then received by the vehicle, which then uses the key to decrypt the encrypted access point credentials thereby obtaining the access point credentials that can be used to establish a secure wireless connection with the non-vehicle WAP.

Referring now to FIG. 1, there is shown an operating environment that comprises a communications system 10 and that can be used to implement the method disclosed herein. Communications system 10 generally includes a vehicle 12 with a wireless communications device 30, a residence 14, one or more wireless carrier systems 70, a land communications network 76, a computer 78, and a remote facility 80. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which include telematics equipment in vehicle 12). Carrier system 70 can implement any suitable communications technology, including for example GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

The location 14 is depicted as a service station, however, it should be appreciated that location 14 may be any location that includes a wireless communication device, such as an assembly location, a dealership, a home residence, a workplace, or any other location. Location 14 is shown to include modem 16 and a wireless communication device 18. The wireless communication device 18 can include a non-vehicle wireless access point (WAP), a processor, memory, and/or a router. A non-vehicle wireless access point is a wireless access point which is not installed as part of the vehicle electronics 20 or carried by vehicle 12. The modem 16 is a modulating-demodulating network hardware device that can modulate and demodulate, or otherwise encode and decode, digital information to be transmitted and received over various network architectures, such as those using cable lines (e.g., twisted-pair telephone cables), satellites, dial-up, radio, fiber optics, and power-line communications.

For example, location 14 may use modem 16 to transfer data between the wireless communication device 18 and land network 76. In another embodiments a modem may not be included at location 14 and the wireless communication device 18 may carry out communication with remote devices over land network 76. In yet another embodiment, wireless communication device 18 may only carry out local communications (e.g., intra-network communications).

Although wireless communication device 18 and modem 16 are depicted as separate components, wireless communication device 18 and modem 16 may be integrated into a single component. For example, modem 16 may be included in wireless communication device 18. In some embodiments, the method provided herein, and which is discussed more below, may be carried out by wireless communication device 18, modem 16, and/or one or more other electronic computing devices, such as a computers 78.

Wireless communications device 18 is capable of communicating data via short range wireless communications (SRWC). In an exemplary embodiment, wireless communications device 18 includes a wireless access point (not shown), a processor (not shown), memory (not show), and an antenna. (not shown), In many embodiments, the wireless communications device 18 may be specifically configured to carry out the method disclosed herein. In one embodiment, wireless communications device 18 may be a standalone module or, in other embodiments, device 18 may be incorporated or included as a part of one or more other computing devices located at location 14, such as a computer 78.

Wireless communications device 18 can be configured to communicate wirelessly using one or more short-range wireless communications (SRWC), such as WiMAX™, Wi-Fi™, Aware™, Neighbor Awareness Networking (TNN). ZigBee™, Wi-Fi Direct™ Bluetooth™, Bluetooth Low Energy™ (BLE), Bonjour™, near field communication (NFC), or any other IEEE 802.11 protocol. A wireless access point can be included in wireless communication device 18 and may include the necessary hardware to operate according to one or more SRWC.

Computers 78 (only one shown) can be some of a number of computers accessible via a private or public network such as the Internet. Each such computer 78 can be used for one or more purposes, such as a web server accessible by the wireless communication device 18. Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12, remote facility 80, or both. A computer 78 can also be used for providing Internet connectivity such as DNS services or as a network address server that uses DHCP or other suitable protocol to assign an IP address to the vehicle 12. Although computer 78 is shown at a location other than location 14, in some embodiments, one or more computers 78 may be located at location 14 and connected to the wireless communication device 18 and/or modem 16.

Remote facility 80 is designed to provide the vehicle electronics 20 with a number of different system back-end functions. The remote facility 80 may include one or more switches, servers, databases, live advisors, as well as an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 76. A database at the remote facility can store account information such as subscriber authentication information, vehicle identifiers, profile records, behavioral patterns, and other pertinent subscriber information. Data transmissions may also be conducted by wireless systems, such as IEEE 802.11x, GPRS, and the like. Although the illustrated embodiment has been described as it would be used in conjunction with a manned remote facility 80 using a live advisor, it will be appreciated that the remote facility can instead utilize a VRS as an automated advisor or, a combination of the VRS and the live advisor can be used.

Mobile device 90 is a non-vehicle wireless device, meaning that it is a device capable of wireless communications and not a part of vehicle 12 or vehicle electronics 20. For example, the device 90 may be a vehicle operator's or user's cellular telephone or other personal mobile device. The mobile device includes: hardware, software, and/or firmware enabling cellular telecommunications and/or short range wireless communication (SRWC), as well as other wireless device functions and applications. The hardware of mobile device 90 comprises a processor and memory for storing the software, firmware, etc. This memory may include volatile RAM or other temporary powered memory, as well as a non-transitory computer readable medium that stores some or all of the software needed to carry out the various external device functions discussed herein. The mobile device processor and software stored in the memory enable various software applications, which may be preinstalled or installed by the user (or manufacturer) (e.g., having a software application or graphical user interface (GUI)). This may include an application that can allow a vehicle user to communicate with vehicle 12 and wireless communication device 18, In some embodiments, the application may enable the device 90 to control various aspects or functions of the vehicle—e.g., among other things, allowing the user to remotely lock/unlock vehicle doors, turn the vehicle ignition on or off, check the vehicle tire pressures, fuel level, oil life, etc. The application may also be used to enable the user of device 90 to view information pertaining to the vehicle (e.g., the current location of the vehicle, whether the vehicle is locked or unlocked) and/or pertaining to an account associated with the user or vehicle. In addition, the application may also allow the user to connect with the remote facility 80 or call center advisors at any time. Wireless device 90 is shown as a smartphone having cellular telephone capabilities. In other embodiments, device 90 may be a tablet, laptop computer, or any other suitable device.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and includes a body control module (BCM) 22, a GPS module 24, other vehicle system modules (VSMs) 26, a wireless communications device 30, vehicle user interfacing components/systems 40-46, and numerous other components and devices. Some or all of the different vehicle electronics may be connected for communication with each other via one or more communication busses, such as bus 28. Communications bus 28 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle 12 can include numerous vehicle system modules (VSMs) as part of vehicle electronics 20, such as BCM 22, GPS module 24, wireless communications device 30, and audio system 40, as will be described in detail below. The vehicle 12 can also include other VSMs 26 in the form of electronic hardware components that are located throughout the vehicle and typically receive input from one or more sensors and use the sensed input to perform diagnostic, monitoring, control, reporting and/or other functions. Such received input can be used to determine a vehicle state. Each of the VSMs 26 is preferably connected by communications bus 28 to the other VSMs, as well as to the wireless communications device 30, and can be programmed to run vehicle system and subsystem diagnostic tests. As examples, one VSM 26 can be an engine control module (ECM) that controls various aspects of engine operation such as fuel ignition and ignition timing and another VSM 26 can be a powertrain control module that regulates operation of one or more components of the vehicle powertrain. One or more VSMs 26 may periodically or occasionally have their software or firmware updated and, in some embodiments, such vehicle updates may be OTA updates that are received from a remote facility 80 via land network 76, modem 16, wireless communication device 18, and wireless communications device 30, as will be discussed more below. As is appreciated by those skilled in the art, the above-mentioned VSMs are only examples of some of the modules that may be used in vehicle 12, as numerous others are also possible.

Body control module (BCM) 22 is shown in the exemplary embodiment of FIG. 1 as being electrically coupled to communication bus 28. In some embodiments, the BCM 22 may be integrated with or part of a center stack module (CSM). Or, the BCM and CSM may be separate devices that are connected to one another via bus 28. BCM 22 may communicate with wireless communications device 30 and/or one or more vehicle system modules, such as GPS 24, audio system 40, or other VSMs 26. BCM may include a processor and memory such that the BCM may direct one or more vehicle operations including, for example, controlling central locking, air conditioning, and power mirrors. BCM 22 may receive data from wireless communications device 30 and, subsequently, send the data to one or more vehicle modules. For example, as will be explained more below, the wireless communications device 30 may receive over-the-air (OTA) updates for one or more vehicle modules. Then, upon receiving such updates, the device 30 may notify and/or send the updates to the BCM 22. BCM 22 may install the updates on the appropriate modules and/or send the updates to the appropriate modules.

Additionally, BCM 22 may provide information corresponding to the vehicle state or of certain vehicle components or systems. For example, the BCM may provide the wireless communications device 30 with information indicating whether the vehicle's ignition is turned on, the gear the vehicle is presently in (i.e. gear state), and/or other information regarding the vehicle. Further, the wireless communications device 30 may provide the BCM 22 with information. For example, BCM 22 may receive a notification or indication from wireless communications device 30 that a certain wireless service is available (e.g., a wireless network connection is available) and/or that a wireless network connection has been established with a hotspot or wireless access point, such as the WAP included in wireless communication device 18.

Wireless communications device 30 is capable of communicating data via short range wireless communications (SRWC). As shown in the exemplary embodiment of FIG. 1, wireless communications device 30 includes a wireless access point 32, a processor 34, memory 36, and an antenna 38. In many embodiments, the wireless communications device 30 may be specifically configured to carry out the method disclosed herein. In one embodiment, wireless communications device 30 may be a standalone module or, in other embodiments, device 30 may be incorporated or included as a part of one or more other vehicle system modules, such as a body control module, an infotainment module, a telematics module, a head unit, CSM, and/or a gateway module. In some embodiments, the device 30 can be implemented as an OEM-installed (embedded) or aftermarket device that is installed in the vehicle.

Wireless communications device 30 can be configured to communicate wirelessly using one or more SRWC. The device 30 may be configured to use specific software protocol(s) and/or may include a set of hardware component(s) that can be used to transmit and receive wireless communications. The wireless communication device 30 may use any SRWC, such as any of the IEEE 802.11 protocols, WiMAX™, Wi-Fi Aware™, Neighbor Awareness Networking (NAN), ZigBee™, Wi-Fi Direct™, Bluetooth™, Bluetooth Low Energy™ (BLE), Bonjour™, or near field communication (NFC). The wireless access point 32 may be configured to operate according to one or more SRWC. Further, the access point 32 may include a wireless chipset that enables one or more SRWC.

In addition to acting as a wireless access point for devices to connect to (e.g., a server mode), wireless communications device 30 may carry out wireless communications with another wireless access point, such as a non-vehicle wireless access point (WAP) included in wireless communication device 18 at location 14. In such an arrangement, wireless communication device 18 may be connected to a modem 16 and provide device 30 a connection to the Internet or other remote network. Device 30 may be set to a station or client mode and, thus, may then carry out wireless communications with wireless communication device 18 or other device, such as mobile device 90. As used herein, a client or a station mode is an operating mode of a wireless communications device that enables the device to act as a station or client device thereby allowing the device to scan for and connect to host or server devices (e.g., wireless access points). More particularly, in the client mode, the client device permits another device (a server device) to control communication protocols, etc. The wireless communication device 18, acting as a server device, may be set to a wireless access point mode and provide a hotspot for device 30 to connect to when operating in a station mode. A hotspot is an area where a wireless data connection may be established between a wireless device operating in a station or client mode and the device hosting the hotspot via a wireless access point. It should be appreciated that the protocol used in providing a hotspot is not limited to Wi-Fi™ and that any SRWC, such as those listed above, may be used.

The wireless communication device 30 may operate in both a station or client mode and a wireless access point mode at the same time through, for example, use of a dual band antenna. Alternatively or additionally, the wireless communications device 30 may switch between a wireless access point mode and a station mode thereby enabling both modes of operation at the same time. This would enable wireless communications device 30 to communicate concurrently with a first wireless device (e.g., a mobile device or VSM) operating in the wireless access point mode and to communicate with wireless communication device 18 operating in the station mode. This may enable the vehicle to throttle wireless communications between devices at or near the vehicle (e.g., VSMs 26) and remote servers or computers (e.g., remote facility 80, computers 78) through device 30.

The wireless communications device 30 may be used by the vehicle to determine whether certain wireless services are available. Additionally, wireless communications device 30 may be used to offer services to one or more wireless devices, such as mobile device 90. As used herein, a wireless service is a service that is offered by one or more wireless devices (the "servicing device") and/or used by one or more wireless devices where the service is performed at least in part through wireless communications. Such services may be, for example, a printing service, an Internet connection service, a vehicle update service, or a vehicle diagnostic service. A secured wireless service is a wireless service that is carried out using secured communications, such as through use of encrypted messages. It should be appreciated that, at least in some embodiments, the wireless service may be embodied in a set of computer instructions, such as a computer application or mobile application, that is installed or configured to be executed on the servicing device. The devices 30 and/or 18 may use a Wi-Fi Aware™ or NAN protocol to broadcast or indicate certain wireless services that the device desires to use, certain wireless services that the device offers, or certain wireless services known to be available at that location.

In one embodiment, the wireless communications device may be communicatively coupled (i.e., connected such that data communications may be carried out) to the servicing device and may be used to transfer data from the vehicle and the servicing device such that a wireless service may be carried out. In such an example, the servicing device may be a computer, such as computer 78, that is connected to the wireless communication device via, for example, a wired Ethernet connection or a wireless connection. In other embodiments, the wireless communication device 18 may be the servicing device and, in other embodiments, mobile device 90 may be the servicing device and may offer a variety of different services. In some embodiments, both mobile device 90, wireless communications device 30, and wireless communication device 18 may operate with one another to provide services among one another. In yet another embodiment, a wireless device connected to wireless communication device 18, such as mobile device 90, may be the servicing device and wireless communication device 18 may be an intermediary device that operates to broadcast certain services offered by the servicing device. There may be any number of intermediary devices and/or servicing devices in any given system 10.

In one embodiment, the vehicle uses WAP 32 to listen for and receive messages, such as Wi-Fi™ beacon messages, from a servicing device or the wireless communication device 18. The vehicle may then evaluate the received messages to determine whether a desired wireless service, such as an Internet connection or a connection to a specific servicing device, such as a certain computer 78, is available. If so, the vehicle can generate and send a request (e.g., a wireless message) to the wireless communication device 18 indicating that it desires to establish a connection to the device 18. The request (or reply message) may include vehicle information, such as a media access control (MAC) address of the wireless communications device 30, a vehicle identification number (VIN), or other identification value. In response to receiving the request from the vehicle, the wireless communication device 18 may then send a message, which includes encrypted access point credentials, back to the vehicle.

As used herein, access point credentials can include credentials that enable the servicing device to establish a secure wireless connection with a client device, such as the vehicle. As used herein, encrypted access point credentials are access point credentials that are encrypted using at least one key. In one embodiment, the access point credentials include a Wi-Fi™ passphrase or password that can be used to establish a secured wireless connection. The vehicle may then receive the message and decrypt the encrypted access point credentials. Thereafter, the vehicle and the wireless communication device can carry out subsequent correspondence to establish a secure connection, which can include determining if the vehicle has obtained the requisite access point credentials. For example, a four-way handshake pursuant to Wi-Fi Protected Access II (WPA2) may be carried out between the wireless communication device 30 and a wireless communication device 18.

In some embodiments, the type of wireless connection that is to be established can be based on the type of service that is being utilized. For example, a printing service may require the communication of low amounts of messages and, thus, BLE may be sufficient. In another example, a large vehicle OTA update may be downloaded from a remote server, such as computer 78 or a server at remote facility 80, and, thus, a Wi-Fi™ connection may be more desirable. Additionally or alternatively, the type of wireless connection can be based on the vehicle state.

Also, wireless communications device 30 may be in communication with one or more remote networks via packet-switched data communication. This packet-switched data communication may be carried out through use of a non-vehicle wireless access point that is connected to a land network via a router or modem, such as wireless communication device 18 and modem 16 described above. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30 via, for example, a telematics unit included in the vehicle. In one embodiment, the communications device 30 may also include a cellular chipset or be communicatively coupled to a device comprising a cellular chipset such as a telematics unit. In either event, communications device 30 may, via a cellular chipset, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 34 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 34 executes various types of digitally-stored instructions, such as software or firmware programs stored in memory 36, which enable the device 30 to provide a wide variety of services. For instance, processor 34 can execute programs or process data to carry out at least a part of the method discussed herein. In one embodiment, device 30 includes an application that enables the method described below in FIG. 2. Memory 36 may include RAM, other temporary powered memory, any non-transitory computer-readable medium (e.g., EEPROM), or any other electronic computer medium that stores some or all of the software needed to carry out the various external device functions discussed herein.

Global position system (GPS) module 24 receives radio signals from a constellation of GPS satellites (not shown), From these signals, the module 24 can determine vehicle position which may enable the vehicle to determine whether it is at a known location, such as service station or other location 14. Moreover, GPS module 24 can provide this location data to wireless communications device 30, which can then use this data to identify known locations, such as a vehicle operator's home or workplace. Additionally, GPS module 24 may be used to provide navigation and other position-related services to the vehicle operator. Navigation information can be presented on the display 42 (or other display within the vehicle) or can be presented verbally such as is done when supplying turn-by-turn navigation. The navigation services can be provided using a dedicated in-vehicle navigation module (which can be part of GPS module 24), or some or all navigation services can be done via, a telematics unit installed in the vehicle, wherein the position information is sent to a remote location for purposes of providing the vehicle with navigation maps, map annotations (points of interest, restaurants, etc.), route calculations, and the like. The position information can be supplied to remote facility 80 or other remote computer system, such as computer 78, for other purposes, such as fleet management. Also, new or updated map data can be downloaded to the GPS module 24 from the remote facility 80 via a vehicle telematics unit.

Vehicle electronics 20 also includes a number of vehicle user interfaces that provide vehicle occupants with a means of providing and/or receiving information, including audio system 40, visual display 42, microphone 44, and pushbutton(s) 46. As used herein, the term "vehicle user interface"

broadly includes any suitable form of electronic device, including both hardware and software components, which is located on the vehicle and enables a vehicle user to communicate with or through a component of the vehicle. Audio system 40 provides audio output to a vehicle occupant and can be a dedicated, stand-alone system or part of the primary vehicle audio system. According to the particular embodiment shown here, audio system 40 is operatively coupled to both vehicle bus 28 and an entertainment bus (not shown) and can provide AM, FM and satellite radio, CD, DVD and other multimedia functionality. This functionality can be provided in conjunction with or independent of the infotainment module described above. Visual display or touch screen 42 is preferably a graphics display, such as a touch screen on the instrument panel or a heads-up display reflected off of the windshield, and can be used to provide a multitude of input and output functions. Microphone 44 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. The pushbutton(s) 46 allow manual user input into the communication device 30 to provide other data, response, or control input. Various other vehicle user interfaces can also be utilized, as the interfaces of FIG. 1 are only an example of one particular implementation.)

With reference to FIG. 2, there is shown an embodiment of a method 200 of automatically establishing a secure wireless connection. In one embodiment, the method may be carried out by wireless communication device 18. In other embodiments, the method may be carried out by wireless communication device 18 and a computer 78 located at location 14. The method begins with step 210, where a beacon signal is transmitted by, for example, wireless communication device 18. The beacon signal may be a wireless signal sent according to a Wi-Fi™ protocol, such as IEEE 802.11b/g/n/ac, to name a few. The beacon signal may also include information pertaining to the location 14, the WAP sending the message, or one or more services that are offered at location 14. In one embodiment, the beacon signal may be sent periodically at a certain time interval, such as every 30 milliseconds. The method 200 continues to step 220.

In step 220, a request is received from a vehicle in response to the beacon signal. In one embodiment, the request is generated at the vehicle in response to receiving the beacon signal sent in step 210. For example, the vehicle 12 may receive the beacon signal and, based on the beacon signal, may determine that it desires to establish a wireless connection with, for example, wireless communication device 18. As discussed above in step 210, the beacon signal may include information identifying one or more available wireless services and, thus, the vehicle may evaluate the beacon signal to determine whether one or more of the available wireless services are desired by the vehicle. In one scenario, the vehicle may desire to check for over-the-air (OTA) updates for one or more vehicle system modules, which may require a connection to a remote network via land network 76. The OTA updates may comprise software or firmware that is to be installed on one or more vehicle system modules. For example, the OTA update may be a firmware update for a VSM 26. In another embodiment, the vehicle may recognize the wireless communication device 18 as being a servicing device or connected to a certain servicing device at a certain dealership or servicing location 14 and, thus, may respond with by sending a request to the communication device 18.

In another embodiment, the request may be a probe request that includes information indicating the vehicle desires to establish a connection. In an alternatively embodiment where no beacon signal is transmitted initially by the wireless communication device 18, the vehicle may send a probe request indicating that it desires to establish a connection. Additionally, the probe request may indicate one or more wireless services the vehicle desires.

In any of these embodiments, the request or the probe request can include an identification value that can be used to identify or authenticate the vehicle 12, which may be a vehicle identification number (VIN) or a media access control (MAC) address of a vehicle component (e.g., vehicle wireless communication device 30 or WAP 32). In other embodiments, the identification value may be a certain pre-programmed value that is used to identify the vehicle (or, other client device) as being already authenticated or authorized to connect to wireless communication device 18 or to access wireless services that are available at location 14 or device 18. The wireless communication device 18 can use the identification value and/or other information provided in the request to determine whether the vehicle is authorized to connect to wireless communication device 18 and/or access certain wireless services. In one embodiment, the device 18 can access a database at a remote facility 80 or computer 78 to determine whether the vehicle is a pre-authorized vehicle and, thus, authorized to automatically connect to device 18.

In some scenarios, the wireless communications device may provide access to a wireless service that requires certain information or data to be provided to the vehicle, such as vehicle software updates, or that requires certain information or data be received from the vehicle, such as diagnostic information. In one embodiment, the wireless communication device 18 may carry out such wireless services via a Wi-Fi™ or Wi-Fi Aware™ hotspot at location 14. As explained above, the wireless communication protocol used by device 18 may require credentials, which may change from time to time. Additionally, the vehicle may desire to access the wireless services at one location 14 and, later, may desire to access the same or other wireless services at another location. The wireless communication devices at these two separate locations may use different credentials, such as different passphrases. Thus, by providing a key to the vehicle or programming a key into the vehicle electronics of the vehicle, the wireless communication device 18 may securely send its encrypted access point credentials to the vehicle and, when the vehicle arrives at a new location or a location that has changed the access point credentials, the vehicle may automatically establish a secure connection via, for example, through receiving the encrypted access point credentials and decrypting the encrypted point credentials using the key. Moreover, the key and/or identification value can be used to authenticate that the vehicle is authorized to access certain wireless services, which may, for example, require querying a database using the identification value to obtain the key for the specific vehicle 12. The method 200 then continues to step 230.

In step 230, the wireless communication device 18 obtains encrypted access point credentials. This step may be carried out in various ways, such as (1) receiving the encrypted access point credentials from a remote device; (2) obtaining a key and, subsequently, encrypting the access point credentials using the key; or (3) recalling the encrypted access point credentials from memory. In a first embodiment, the encrypted access point credentials may be received from a remote device, such as an electronic computing device at remote facility 80 or computer 78. In this embodiment, the access point credentials may be already encrypted using a key and stored in a database or other memory. In a second embodiment, the wireless communication device 18 may obtain a key from a remote facility 80 or computer 78. The device 18 may also recall from memory, or otherwise obtain, the access point credentials. Then, the wireless communication device 18 may use the key in conjunction with an encryption algorithm or method to encrypt the access point credentials thereby obtaining the encrypted access point credentials. In a third embodiment, the encrypted access point credentials may be recalled from a memory at location 14, such as a memory device that is included as part of device 18. In such an embodiment, a data file may be saved in memory every time the access point credentials change, such as a change of a Wi-Fi™ passphrase. In any of the above discussed embodiments, and/or in other embodiments, the key may be personal to a vehicle component of the vehicle electronics, a vehicle, a certain make, a certain model, a certain model-year, a certain manufacturing facility of the vehicle, or any other classification or group. The method 200 continues to step 240.

In step 240, a wireless message that includes the encrypted access point credentials is compiled and sent to the vehicle. The wireless message may be a Wi-Fi™ or Aware™ frame that is addressed to the vehicle or the vehicle wireless communication device 30. The message can include the encrypted access point credentials. The message is then transmitted using the wireless access point and antenna included in the wireless communication device 30. In some embodiments, steps 230 and 240 may be carried out only if it is determined that the vehicle is authorized to connect to the wireless communication device 18. For example, a database at a remote facility 80 or computer 78 may be queried using the identification value provided by the vehicle and, based on the query response, it may be determined that the vehicle is authorized to connect to the wireless communication device 18. If the vehicle is authorized, then the steps 230 and 240, as well as the rest of the method 200, may be carried out. The method 200 continues to step 250.

In step 250, the wireless communication device receives a message from the vehicle. In one embodiment, the message includes the access point credentials, such as the passphrase. In response to receiving the wireless message that was transmitted in step 240, the vehicle 12 may obtain the encrypted access point credentials that are stored in the wireless message. Subsequently, the vehicle may use the key to decrypt the encrypted access point credentials. The key may be obtained from memory 36 or it may be obtained via a connection to a remote computer 78 using other network connections, such as a cellular connection over carrier system 70. After the credentials are decrypted, the vehicle may then send a message that includes the access point credentials. In one embodiment, the access point credentials include a service set identifier (SSID) and a passphrase. In other embodiments, the access point credentials include only a passphrase. The vehicle may then use the passphrase and/or other information to establish a secure connection with the wireless communication device 18. After the message is received with the appropriate credentials, the wireless communication device 18 and the vehicle wireless communication device 30 may carry out subsequent communications to establish a secure wireless connection. In one embodiment, a four-way handshake pursuant to Wi-Fi™ Protected Access II (WPA2) may be carried out between the wireless communication device 30 and a wireless communication device 18. The method 200 continues to step 260.

In step 260, after a secure connection is established, the wireless communication device may provide the vehicle with certain wireless services. For example, the vehicle 12 may download vehicle system module updates, such as software or firmware updates, via the wireless communication device 18. In another embodiment, the wireless communication device 18 may download diagnostic information from the vehicle 12 and store such information in memory or send the information to a remote device, such as a computing device or database at remote facility 80 or computer 78. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive or. Put differently, the phrase "A, B, and/or C" includes: "A"; "B"; "C"; "A and B"; "A and C"; "B and C"; and "A, B, and C."

What claimed is:

1. A method of automatically establishing a secure wireless connection, the method comprising:

transmitting a wireless signal indicating availability of a secured wireless service, wherein the wireless signal is transmitted from a non-vehicle wireless access point;

receiving a request from a vehicle in response to the wireless signal, wherein the request includes an identification value that can be used to identify or authenticate the vehicle;

in response to receiving the request, sending a message via wireless communications to the vehicle, wherein the message includes encrypted access point credentials, and wherein the encrypted access point credentials are encrypted using a key that is at least partly based on the identification value; and establishing a secure wireless connection with the vehicle based on receipt of access point credentials in one or more messages sent from the vehicle, wherein the secure wireless connection is established in response to the vehicle decrypting the encrypted access point credentials using the key and sending the access point credentials to the non-vehicle wireless access point, and wherein the key is programmed or stored on the vehicle at the time of vehicle manufacture.

2. The method of claim 1, wherein the establishing step further comprises determining that the received access point credentials are the access point credentials that were sent in encrypted form to the vehicle.

3. The method of claim 1, wherein the wireless signal is a beacon signal that is transmitted periodically.

4. The method of claim 1, wherein the request received from the vehicle is a probe request that includes information indicating the vehicle desires to establish a connection.

5. The method of claim 1, further comprising the step of, in response to receiving the request, using the identification value to determine whether the vehicle is authorized to automatically establish a secure connection with the non-vehicle wireless access point.

6. The method of claim 1, further comprising the steps of:
obtaining the key based on the identification value; and
obtaining the access point credentials of the non-vehicle wireless access point; and
encrypting the access point credentials using the obtained key.

7. The method of claim 1, wherein the identification value is based on one or more of the following: a media access control (MAC) address or a vehicle identification number (VIN).

8. The method of claim 1, further comprising the step of, after establishing a secure wireless connection, carrying out the secure wireless service using the established secure wireless connection.

9. The method of claim 1, wherein the secure wireless connection includes use of at least one of the following protocols: Wi-Fi™, Wi-Fi Aware™, Bluetooth™, or Bluetooth Low Energy™.

10. A method of automatically establishing a secure wireless connection, wherein the method is carried out by a wireless communication device, the method comprising:
receiving a wireless request from a vehicle, wherein the wireless request indicates that the vehicle desires to connect to the wireless communication device;
processing the wireless request to obtain information relating to the vehicle;
broadcasting a wireless message, wherein the wireless message includes encrypted access point credentials, wherein the encrypted access point credentials are access point credentials for the wireless communication device, or a component thereof, that are encrypted using a key;
receiving credentials from the vehicle after broadcasting the wireless message, wherein the vehicle is configured to: decrypt the encrypted access point credentials using a copy of the key that is stored at the vehicle to obtain the credentials; and send the credentials to the wireless communication device, wherein the copy of the key is a digital value that is known to the vehicle before any steps of the method are carried out;
authenticating the credentials received from the vehicle by comparing the credentials with the access point credentials; and
establishing a wireless connection with the vehicle based on the authentication of the credentials.

11. The method of claim 10, further comprising the step of periodically transmitting a beacon signal, wherein the beacon signal indicates an availability of one or more wireless services, and wherein the wireless request is generated by the vehicle in response to the beacon signal.

12. The method of claim 10, wherein the wireless message is broadcasted periodically until the wireless connection with the vehicle is established.

13. The method of claim 10, wherein the access point credentials include a service set identifier (SSID), a password or a passphrase, or both.

14. The method of claim 10, further comprising the step of determining a wireless service based on the information obtained from the processing of the wireless request.

15. The method of claim 14, wherein the sending step is carried out only if it is determined that the wireless service is available at, or through use of, the wireless communication device.

16. The method of claim 14, further comprising the step of carrying out communications between the vehicle and a servicing device, wherein the servicing device offers the wireless service to the vehicle.

17. The method of claim 16, wherein the servicing device is either the wireless communication device or is located at a remote location with respect to the wireless communication device.

18. A wireless communications system, comprising:
a wireless communications device, comprising:
a wireless communication chipset;
a computer-readable memory; and
a processor;
wherein the wireless communications device is configured to:
transmit a wireless signal indicating availability of a secured wireless service;
receive a request from a vehicle in response to the wireless signal, wherein the request includes an identification value that can be used to identify or authenticate the vehicle;
in response to receiving the request, send a message via wireless communications to the vehicle, wherein the message includes encrypted access point credentials, and wherein the encrypted access point credentials are encrypted using a key that is at least partly based on the identification value; and
establish a secure wireless connection with the vehicle based on receipt of access point credentials in one or more messages sent from the vehicle, wherein the secure wireless connection is established in response to the vehicle decrypting the encrypted access point credentials using the key and sending the access point credentials to the wireless communications device, and wherein the key is programmed or stored on the vehicle at the time of vehicle manufacture.

* * * * *